United States Patent [19]
Legrandgérard

[11] 3,779,271
[45] Dec. 18, 1973

[54] VALVES WITH REPLACEABLE PACKING

[75] Inventor: Jean Marcel Legrandgérard, Chenneviers-sur-Marne, France

[73] Assignee: ADAR, Hauts-de-Seine, France

[22] Filed: Mar. 21, 1972

[21] Appl. No.: 236,731

[30] Foreign Application Priority Data
Mar. 29, 1971 France .............................. 7110912

[52] U.S. Cl. ................... 137/315, 251/214, 251/330
[51] Int. Cl. ............................................ F16k 41/02
[58] Field of Search ........................... 137/315, 329; 251/214, 330; 277/33, 102, 103

[56] References Cited
UNITED STATES PATENTS
| | | | |
|---|---|---|---|
| 1,995,395 | 3/1935 | Mohr | 137/315 |
| 2,663,318 | 12/1953 | Lakso | 251/330 X |
| 3,257,095 | 6/1966 | Siver | 251/330 X |
| 3,269,698 | 8/1966 | Koch | 251/330 X |

*Primary Examiner*—Martin P. Schwadron
*Assistant Examiner*—David R. Matthews
*Attorney*—Linton & Linton

[57] ABSTRACT

In this device with replaceable packing auxiliary valve means are provided between the tubular valve guide and the surrounding valve body whereby, upon release of the means rigidly interconnecting the valve guide and valve stem, said auxiliary valve means can be closed to permit a continuous operation of the apparatus while replacing the worn packing elements. (Figure 2)

1 Claim, 2 Drawing Figures

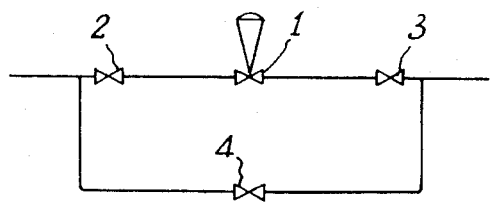
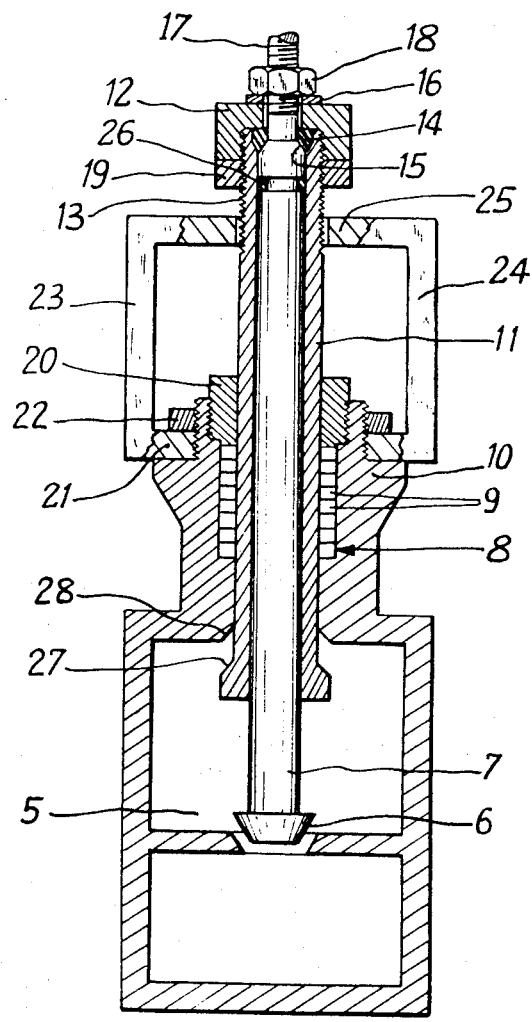

VALVES WITH REPLACEABLE PACKING

FIELD OF THE INVENTION

This invention relates to valves in general and has specific reference to a device permitting of replacing a packing of like seat through which a movable transmission member is fitted so as to ensure a reliable fluid tightness between two media in which different pressures prevail, while permitting the proper operation of said transmission member during the replacement of the packing seals or rings.

SUMMARY OF THE INVENTION

According to this invention the transmission member, for example of the reciprocating type, is mounted in a fluid-tight manner in a tubular guide to which it is normally rigidly connected so as to move bodily therewith through the packing, said guide carrying within a chamber to be isolated from the external atmosphere a valve member adapted to co-act with the body enclosing said chamber after the guide has been disengaged from the transmission member and brought to a fixed valve-closing position, in which the packing can be removed and have its sealing elements replaced without discontinuing the operation of the transmission member.

The transmission member may consist for example of the control stem of a regulation valve. In this case the present invention facilitates the packing replacement while providing a considerably simpler and more economical arrangement.

BRIEF DESCRIPTION OF THE DRAWINGS

In order to afford a clearer understanding of this invention, a typical form of embodiment thereof will now be described by way of example with reference to the accompanying drawings, in which:

FIG. 1 is a general and known commercial circuit section requiring the use of a regulation valve provided with packing means, and FIG. 2 is a simplified axial section showing a device according to this invention applicable notably to a regulation valve and permitting a further simplification of the known arrangement illustrated diagrammatically in FIG. 1.

DESCRIPTION OF THE PREFERRED EMBODIMENT

In FIG. 1 a circuit section is shown by way of example, that is, for illustrating a typical manner of embodying the present invention in the case of a known arrangement incorporating a packing-type regulation valve. The reference numeral 1 designates the regulation valve mounted on a pipe line between a pair of isolating valves 2 and 3, an auxiliary valve 4, normally closed, being inserted in a branch line by-passing the assembly 2, 1 and 3. When for example maintenance works such as the replacement of the wearing elements or seals of the packing of regulation valve 1 must be performed, the isolating valves 2 and 3 are closed and by-pass valve 4 is opened to permit the fluid flow through the circuit. With this invention, as will be explained presently with reference to FIG. 2, it is possible to dispense with the use of the three valves 2, 3 and 4, and also, of course, with the branch or by-pass line comprising the valve 4.

In FIG. 2 the reference numeral 5 designates a chamber normally at a pressure other than that prevailing within the device, which is generally the atmospheric pressure. A member 6 illustrates very diagrammatically a valve member adapted to be reciprocated from an upper driving member (not shown) through a transmission member consisting of the axial valve stem 7. The fluid tightness between the chamber 5 and the external or surrounding atmosphere or medium is obtained by means of a packing 8 comprising sealing elements for example in the form of a plurality of O-rings 9, this packing being adapted to be opened from the outside.

According to this invention, this packing 8 is disposed between on the one hand the body 10 in which chamber 5 is formed and, on the other hand, a tubular guide 11 assembled with stem 7 notably through a nut 12 screwed on the upper screw-threaded end of guide 11. This nut 12 comprises a gasket or like seal 14 engaging a shoulder 15 of stem 7. The latter extends through the nut 12 and also through an outer washer 16 and comprises a screw-threaded portion 17 engaged by a tightening nut 18 completing the means for assembling said stem 7 and guide 11. The reference numeral 19 designates a lock nut associated with nut 12.

Under normal operating conditions the stem 7 is reciprocated to actuate the valve member 6 while carrying along the tubular guide 11 through the packing 8 compressed by a packing gland 20 screwed in the upper end of the valve body 10 receiving in turn the base of the valve bow 21 which is clamped by a nut 22 against an upper shoulder formed in said body 10. The bow base 21 is connected through lateral arcuate arms 23 and 24 to an upper bow portion 25 formed with a central aperture freely engaged by the guide sheath 11.

To permit the replacement of the packing O-rings 9 without discontinuing the operation of the transmission stem 7, an annular gasket or like seal 26 is provided on the stem 7 within the guide 11, in conjunction with a frustoconical valve portion 27 formed at the lower end of guide 11 and adapted to be brought into sealing contact with a matching annular seat 28 formed in the body 10, said valve portion 27 and seat 28 being for example ground in to secure the desired fluid-tight seating of the valve member when the guide 11, after having been disconnected from the stem 7, is pulled upwards until said valve portion 27 engages the registering seat 28.

Now the procedure to be adhered to for replacing the packing material in the sealing portion 8 without discontinuing the operation of the main valve member 6, i.e. the movement of stem 7, will be explained. Firstly, the top nut 18 is released and the washer 16 pulled away; then, the guide nut 12 is unscrewed and the gasket 14 also moved upwards so that only the O-ring 26 seals the gap between stem 7 and guide 11, the latter being thus disconnected from stem 7 and capable of sliding therealong. Then the lock nut 19 is screwed on the screw-threaded portion 13 of guide 11 (while holding the latter against rotation) until this lock nut 19 abutes the top of bow 25, whereafter the lock nut 19 is further screwed in so that, as this nut reacts against said top portion 25, the tubular guide 11 is caused to slide upwards or outwards until its valve portion 27 engages the seat 28 of body 10, thus providing (in replacement of packing 8) the necessary fluid-tightness between the guide 11 and body 10, while the stem 7 can be maintained in motion through its driving motor (not shown). Under these conditions an easy access to the O-rings 9 can be had by removing the packing-gland 20 so that new O-rings can be substituted for the worn ones.

After this substitution the above-described operations are repeated in the reverse order, i.e. : re-tightening the packing by screwing in the packing gland 20, tightening the nut 12 by compressing the gasket 14, releasing the lock nut 19 in order to move same away from the top portion 25 of the bow so as to restore its lock-nut function by engaging the underface of nut 12 (while holding the guide 11 against rotation), and eventually tightening the top nut 18 so as to cause the guide 11 to slide downwards along the stem 7 and move the valve portion 27 away from its seat 28. The inward movement of guide 11 is continued until its maximum operative stroke, under normal service conditions, cannot cause the valve portion 27 thereof to engage the seat 28.

Of course, the exemplary form of embodiment of the invention described hereinabove should not be construed as limiting the scope of the invention since various constructional modifications or additions may be contemplated without inasmuch departing from the basic principles of the invention as set forth in the appended claims.

Furthermore, although the present invention has been described with specific reference to a typical form of embodiment thereof, namely a regulation valve, it will clearly occur to those conversant with the art that this form of embodiment is given by way of illustration, not of limitation.

I claim:

1. A valve with replaceable packing comprising a valve body having a valve chamber, an adjacent passage communicating with said valve chamber, a valve seat between said valve chamber and said passage, an axial bore opening in said valve chamber and a second valve seat in said valve chamber at said axial bore, a tubular valve guide slideably mounted through said axial bore and extending into said valve chamber, a valve stem slideably and rotatably mounted through said valve guide and extending into said valve chamber, a valve member carried by said valve stem and capable of closing said first valve seat, said valve body having an open end recess surrounding a portion of said valve guide, a plurality of packing elements in said valve body recess around said valve guide, said valve body having a collar portion coaxial with said valve guide adjacent said valve body recess and having external and internal threads and an external shoulder extending from said external threads, a packing gland in threaded engagement with said valve body internal threads at said valve body recess open end and positioned for compressing said packing elements, a nut in threaded engagement with said collar external threads, a member having a base seated on said shoulder and a threaded bore in said base in threaded engagement with said collar external threads and a top with a threaded bore, said valve guide having a threaded portion in threaded engagement with said member top threaded bore, said valve stem having a threaded portion extending outwardly of said valve guide and having a shoulder, a nut in threaded engagement with said valve guide threaded portion, a lock nut in threaded engagement with said valve guide threaded portion between said nut and the top of said member and capable of locking said first nut in a position for causing said valve guide to move with said valve stem when a reciprocating motion is imparted thereto, said valve stem having a groove normally inside said valve guide threaded portion and capable of sealing the space between said valve stem and said valve guide while permitting a relative sliding motion therebetween when the valve is in operative condition, a gasket positioned between said first nut, said valve guide and said valve stem shoulder, a washer surrounding said valve stem threaded portion and seated on said first nut, a second nut in threaded engagement with said valve stem threaded portion and seated on said washer locking said first nut in position in the normal operation conditions of the valve and completing the operative connection between said valve stem and said valve guide and a valve portion on said valve guide in said valve chamber and positioned for closing said second valve seat upon longitudinal movement of said valve guide whereby removal of said first and second nuts and movement of said locking nut towards said member top permits movement of said valve guide until said valve guide valve portion closes said valve seat and withdrawal of said packing gland from said valve body collar permits replacement of said packing elements while the valve remains in operative condition.

* * * * *